Dec. 22, 1970  H. T. KELSH  3,549,234
KELSH PLOTTER WITH VARIABLE LENS SYSTEM
Filed Aug. 20, 1969  2 Sheets-Sheet 1

INVENTOR
HARRY T. KELSH

BY *Albert J. Kramer*
ATTORNEY

Dec. 22, 1970     H. T. KELSH     3,549,234
KELSH PLOTTER WITH VARIABLE LENS SYSTEM
Filed Aug. 20, 1969     2 Sheets-Sheet 2

INVENTOR
HARRY T. KELSH

BY *Albert J. Kramer*
ATTORNEY

United States Patent Office 3,549,234
Patented Dec. 22, 1970

3,549,234
KELSH PLOTTER WITH VARIABLE LENS SYSTEM
Harry T. Kelsh, 4600 Connecticut Ave. NW., Washington, D.C. 20037
Continuation-in-part of application Ser. No. 946,410, July 31, 1969. This application Aug. 20, 1969, Ser. No. 851,584
Int. Cl. G02b 27/22; B43i 13/18
U.S. Cl. 350—136                                    15 Claims

ABSTRACT OF THE DISCLOSURE

A Kelsh type plotter is modified by providing a projection lens in two parts, namely, a fixed lens element and a movable lens element. The movable lens element is constrained to move to and from the fixed lens element according to the movements of the tracing table over the mapping table thereby to adjust the focal length of the lens for optimum resolution with large aperture opening.

---

This is a continuation-in-part of my copending application for patent Ser. No. 846,410, filed July 31, 1969.

This invention relates to photogrammetric plotters and more particularly to improvements in Kelsh type plotters.

Kelsh type plotters, which originated with U.S. Pat. No. 2,492,870, have come into wide commercial use and are considered indispensable tools of the photogrammetric art.

The Kelsh plotter comprises essentially a stereoscopic pair of horizontally mounted diapositives, a movable projection lamp for scanning each diapositive, a lens system associated with each diapositive, a vertically adjustable horizontal platen on a tracing table movable over a drawing surface, and a linkage between the projection lamps and the tracing table for constraining light projected from the lamps simultaneously onto the tracing table through the lens system. The images may be projected and viewed either anaglyphically or by intermittent techniques.

The lens systems are conventionally of a fixed focal length which means that at only one fixed distance of the platen from each lens will the projected images be in focus. At all the other positions of the platen, the images will be out of focus, more or less. Therefore, these lens systems are designed with a substantial "depth of focus" in which the light rays converge in relatively narrow cones of light provided by relatively narrow apertures. For many types of work such lens systems were satisfactory. However, where high resolution and greater illumination are necessary for precision results, such lenses are frequently unsatisfactory and result in a decreased resolution with reduction of illumination.

The general object of the invention is the provision of improvements in a Kelsh type plotter which overcome the difficulties set forth above.

A specific object is the provision of improvements in a Kelsh type plotter which make it possible to provide greater illumination and greater resolution of the projected images.

Another object of the invention is the provision of an improved lens in a Kelsh type plotter which automatically adjusts the focal length as a function of the distance between the lens and the platen of the tracing table.

A further object is the provision of a variable focal length lens in a Kelsh plotter having a movable lens element and a linkage between the lens element and the platen of the tracing table for changing the position of the lens element in accordance with a function of the movements of the platen to change the focal length of the lens correspondingly.

A further object is the provision of a Kelsh plotter having a variable focal length lens system which makes it possible to use the plotter with different diameter enlargements of diapositives.

These and still further objects, advantages and features of the invention will appear more fully from the following description considered together with the accompanying drawing.

Figure 1:
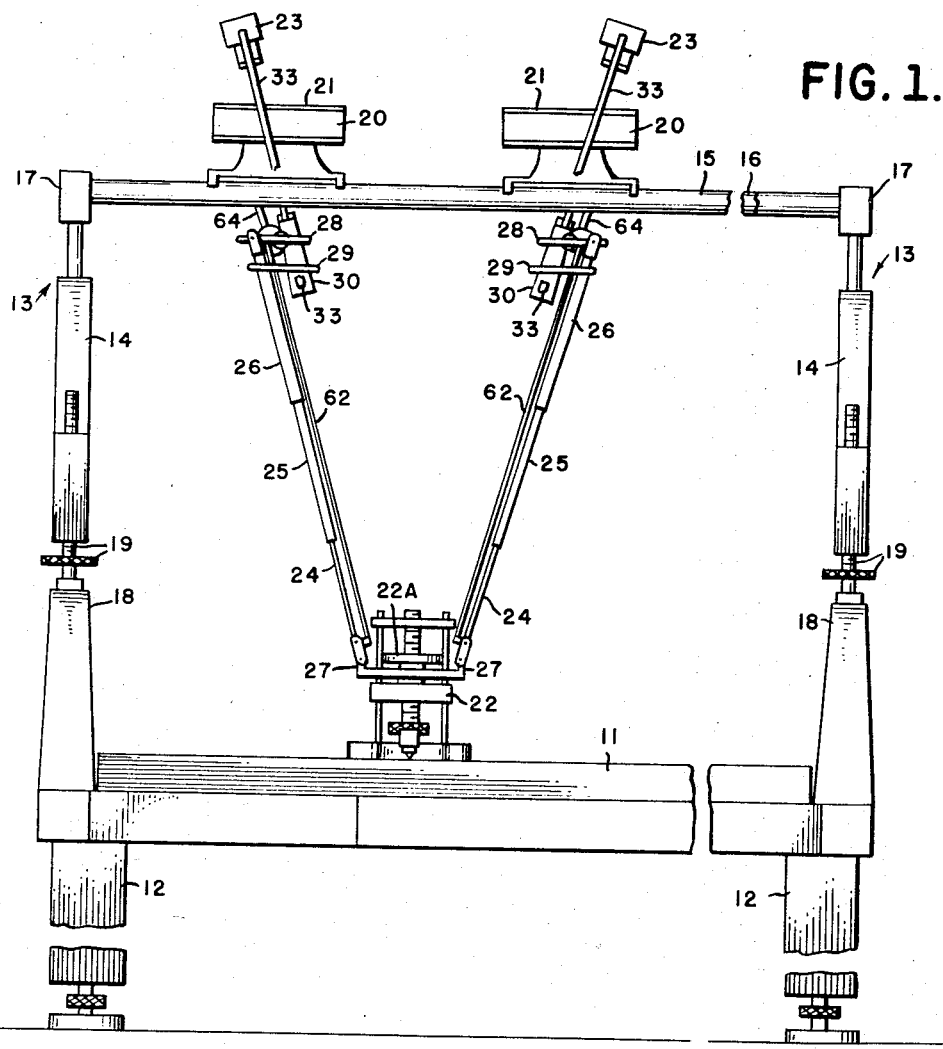
FIG. 1 is a front elevational view of a Kelsh type plotter, partly broken away, which incorporates the improvements of this invention.
Figures 5, 6:
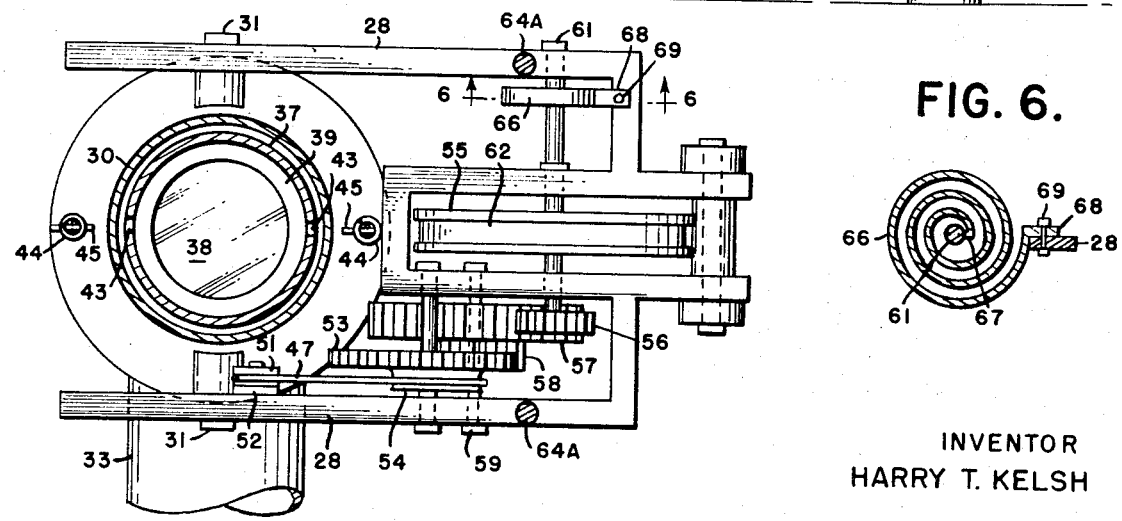
Figure 3:
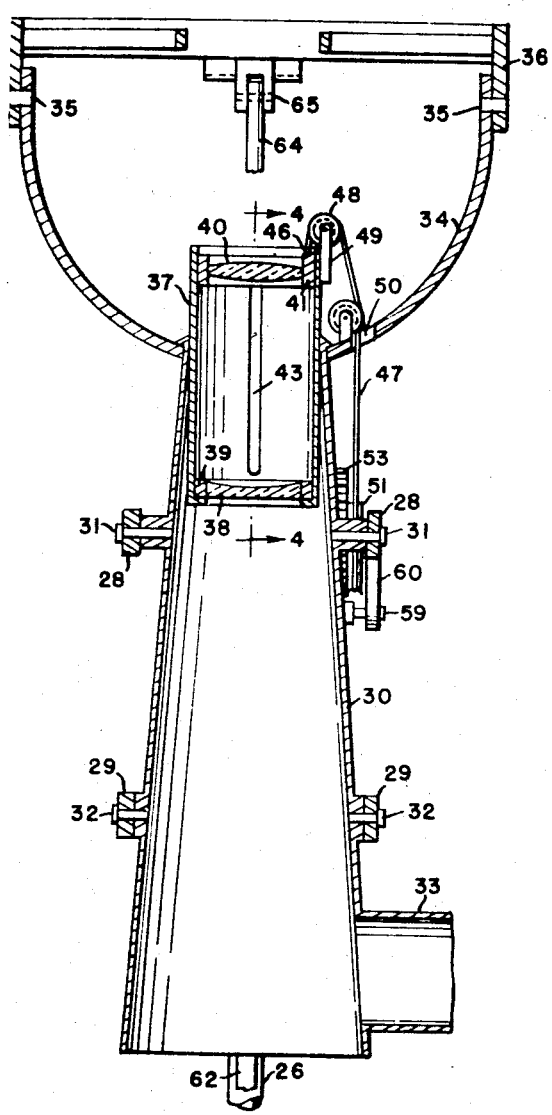
Figure 2:
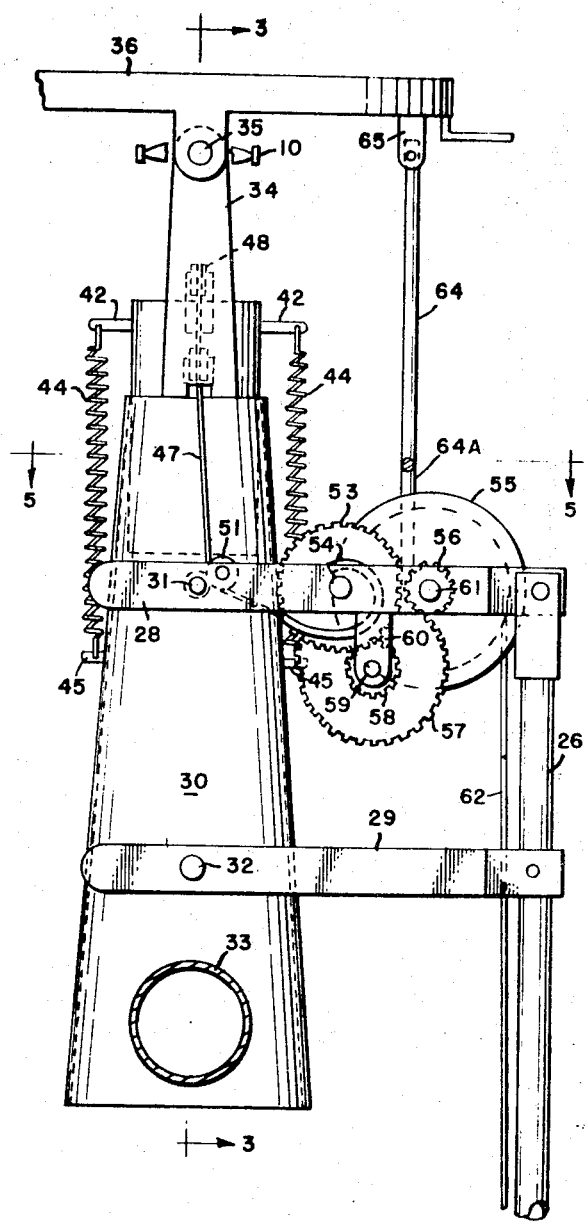
FIG. 2 is an elevational view of a portion of the embodiment, on a larger scale, illustrating the features of the improvement.
Figure 4:
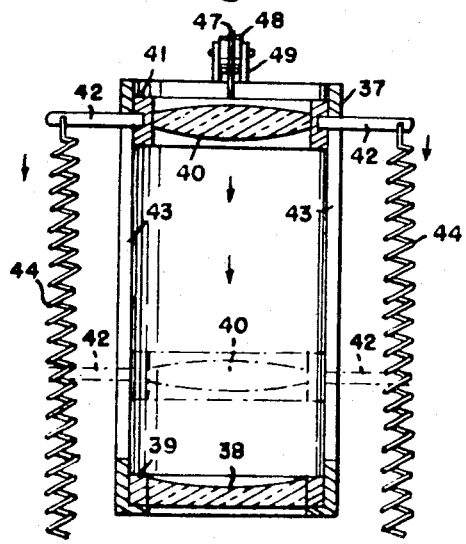

FIG. 3 is a sectional view along the line 3—3 of FIG. 2.
FIG. 4 is a sectional view along the line 4—4 of FIG. 3.
FIG. 5 is a cross-sectional view along the line 5—5 of FIG. 2.
FIG. 6 is a cross-sectional view along the line 6—6 of FIG. 5.

Referring to the drawing with more particularity, the embodiment is illustrated in relation to a Kelsh type plotter which includes a mapping table 11 supported on legs or pillars 12, an upper frame 13 including side panels 14 and parallel horizontal tracks 15 and 16 rigidly set in end pieces 17. The frame 13 is adjustably supported on lower frame members 18 by vertical adjusting elevator screws 19.

Projection units 20 are slidably mounted on the tracks 15 and 16 and conventional means (not shown) are provided for clamping each of these units in a given position on the tracks.

Each projection unit contains a projection lens 10 and a diapositive mount 21.

A conventional tracing table 22 is carried on the mapping table 11 below the projection units 20 and light projector 23 is disposed above each projection unit which is supported and moved by the linkage hereinafter described.

The linkage comprises a pair of telescopable arms each formed of hollow tube sections 24, 25 and 26, pivotally connected at one end to a side arm 27 of the tracing table 22, at the level of the tracing table platen 22A, the other end being pivotally connected to the outer ends of pairs of upper and lower parallel links 28, 28 and 29, 29, respectively. The inner ends of the links 28, 28 and 29, 29, respectively, straddle and are pivotally connected to a frusto-conical light tube 30 by pins 31, 31 and 32 and 32, respectively.

The lower end of a gooseneck 33 is secured to each tube 30 and the upper end of the gooseneck carries the light projector 23.

The tube 30 is secured to a yoke 34 which is pivotally mounted by trunnions 35 on a gimbel ring 36 of the projection units 20, whereby universal pivoted movement of the tube 30 is effected.

The bottom of the yoke 34 has an opening in which the upper narrower end of the tube 30 is secured, such as by welding. In the upper narrower end of the tube 30 there is coaxially fixed a cylindrical barrel 37. At the bottom of the barrel 37 a concave lens element 38 in a lens ring 39 is secured. Above the lens element 38 there is slidably mounted in the barrel 37 a convex lens element 40 in a lens ring 41.

Radial fingers 42 are secured to the lens ring 41 at diametrically opposite sides. These fingers project through longitudinal slots 43 in opposite sides of the barrel 37. The lens element 40 is biased to a downward position by a pair of coil springs 44 mounted between the fingers 42 and brackets 45 on the tube 30.

One end 46 of a cable 47 is secured to the ring 41. The cable extends over a sheave 48 mounted on a bracket 49 at the top of the barrel 37, then it passes through an aperture 50 of the yoke 34; then over a sheave 51 on bracket 52 secured to one of the upper parallel links 28; then to a gear wheel 53 pivotally mounted on the said link 28 to which the other end of the cable is secured about an arched strip 54 secured to the side of the gear wheel 53. The strip 54 is of a predetermined geometrical shape, e.g., involute, to secure a desired movement of the lens element as a function of the movement of the tracing table, as will appear more fully hereinafter.

The gear wheel 53 is geared to a winding reel 55 rotatably mounted on the said link 28 by a train of gears 56, 57 and 58. The gears 57 and 58 are concentrically secured to a shaft 59 mounted on a bracket 60 of the said link 28. The gear 56 is secured to the same shaft 61 as the reel 55.

The reel 55 carries a length of tape 62, the outer end of which extends downward alongside the tubular member 24, 25, and 26, whereupon it is secured to a bracket 63 of the tracing table arm 27.

The winding reel 55 may be of any conventional type. The type illustrated comprises a coil spring 66 mounted on the shaft 61. The inner end 67 of the coil spring is secured to the shaft 61 and the outer end 68 is secured to the link 28 by a rivet 69. The spring 66 is wound counter-clockwise, as viewed in FIG. 6, and it is sufficiently strong to counter-bias the spring 44 in order to take up any slack in the tape 62.

As the tracing table 22 moves over the surface of the mapping table 11, the telescopable sections 24, 25 and 26 are contracted and extended relative to each other which result in a raising and lowering of the convex lens element 40, thereby continuously adjusting the focal length of the projection lens system automatically and insuring high resolution images from each of the two projection systems.

A support link 64 is connected at its lower end to a yoke 64A which in turn is connected to the links 28 and the upper end of the link 64 is pivoted to a bracket 65 of the gimbel ring 36 to maintain the links 28 and 29 in horizontal position.

The invention is adaptable to many variations. For example, if the instrument is provided with 6 inch projection lens and with a projection distance of 30 inches, a five diameter enlargement will result. By simply replacing the projection lens with one of 8¼ inches focal length, for example, and adjusting the diapositive 21 to a position 8¼ inches from the projection lens 10, the image sharpness will remain the same at the same 30 inches. The scale will then be approximately 3.6. To increase the scale to five times the projector may be elevated from 30 to 41 inches by the elevating screws 19. Hence, a change to different focal length photography is made possible by means of this invention through relatively simple adjustments.

The gearing between the convex lens element 40 and the tracing table 22 will depend upon the results to be achieved in any particular case. For example, in the case of 136 mm. focal length, which is preferred in the interest of size reduction, the relation between (1) the projection distance and (2) the spacing between the lens elements would be as follows:

| Projection distance, inches | Separation of lens elements, inches |
|---|---|
| 15 | 1.91 |
| 20 | 1.43 |
| 25 | 1.15 |
| 30 | 0.95 |
| 35 | 0.81 |
| 40 | 0.72 |
| 45 | 0.63 |
| 50 | 0.57 |
| 55 | 0.53 |
| 60 | 0.48 |
| 65 | 0.45 |
| 70 | 0.41 |

I claim:

1. In a photogrammetric projection plotter having projection lenses, each lens comprising a fixed lens element and a lens element movable relative to the fixed element to change the focal length of the lens, a mapping table, a tracing table movable over the surface of the mapping table, said tracing table having a platen onto which images are projected by the lenses, and means straddling the platen for interconnecting the movable lens element with the tracing table to move the movable lens element relative to the fixed lens element as a function of the movement of the platen relative to the mapping table and maintain the projected images in focus on the platen.

2. In a photogrammetric projection plotting device having a mapping table, a tracing table having a platen movable over the mapping table, and a pair of projection systems for projecting images on the platen including each a projection lens, each lens comprising lens elements, means supporting the lens elements for movement relative to each other to change the focal length of the lens, and means straddling the platen for interconnecting the lens elements with the tracing table to move the lens elements to and from each other as a function of the movements of the platen relative to the mapping table and maintain the projected images in focus on the platen.

3. In a photogrammetric projection plotting device as defined by claim 2 in which means are provided for biasing the lenses in one direction relative to each other and separate means are provided for moving the lens elements against the biasing means.

4. In a photogrammetric projection plotting device as defined by claim 3 in which the biasing means comprises a spring.

5. In a photogrammetric projection plotting device as defined by claim 3 in which the means for moving the lens elements against the biasing means comprises a cable having one end connected to a movable lens and the other end connected to a take-up drum, means for rotating said drum, including a tape connected at one end to the tracing table and the other end to a second drum, said drums being mutually geared to each other.

6. In a photogrammetric device as defined by claim 2 in which the projection systems each comprise a light tube through which light is projected, a lens barrel in the light tube, lens elements in the lens barrel, one of the lens elements being movable relative to the other lens element, means biasing the movable lens element in one direction relative to the other lens element and means for moving the movable lens element against the biasing means.

7. In a photogrammetric projection device as defined by claim 6 in which the lens barrel comprises a pair of longitudinal slits on opposite sides, fingers projecting through the slits and connected to the movable lens and a spring connected between the fingers and the light tube.

8. In a photogrammetric projection device as defined by claim 6, vertically spaced horizontal arms pivotally connected at their inner ends to the light tube, a telescopable arm having its upper end pivotally connected to the outer ends of the horizontal arms, the lower end of the telescopable arm being pivotally connected to the tracing table.

9. In a photogrammetric projection device as defined by claim 6 in which one of the lens elements is a concave element and the other is a convex element.

10. In a photogrammetric projection device as defined by claim 9 in which the convex lens element is movable.

11. In a photogrammetric projection device as defined by claim 6 in which the light tube is in the form of a truncated hollow cone.

12. In a photogrammetric projection device as defined by claim 8 in which the means for moving the lens element against the biasing means comprises a cable having one end connected to the movable lens element and the other end connected to a take-up drum, means for rotating said drum including a tape connected at one end to the tracing table and the other end to a winding reel, said drum winding reel being mutually geared to each other and being mounted on one of said horizontal arms.

13. In a photogrammetric projection device as defined by claim 12 in which a guide sheave is disposed between the ends of the cable on the light tube adjacent the pivot axis of the arm and light tube.

14. In a photogrammetric projection device as defined by claim 8 in which the tracing table has a viewing platen and the lower end of the arm is pivotally connected to the tracing table at the level of the viewing platen.

15. In a photogrammetric projecting device as defined by claim 12 in which the take-up drum has the shape of an involute.

References Cited

UNITED STATES PATENTS

| | | | |
|---|---|---|---|
| 2,552,975 | 5/1951 | Kelsh | 33—20DUX |
| 2,693,129 | 11/1954 | Nistri | 33—20DX |
| 2,747,461 | 5/1956 | Boughton et al. | 33—20DX |
| 2,751,813 | 6/1956 | Bauersfeld et al. | 33—20DX |
| 3,228,285 | 1/1961 | Kelsh | 33—20D |

FOREIGN PATENTS

| | | | |
|---|---|---|---|
| 141,064 | 6/1953 | Sweden | 33—20D |
| 287,904 | 12/1952 | Switzerland | 33—20D |
| 424,710 | 1/1926 | Germany | 33—20D |
| 461,248 | 5/1928 | Germany | 33—20D |

DAVID SCHONBERG, Primary Examiner

PAUL A. SACHER, Assistant Examiner

U.S. Cl. X.R.

33—20; 356—2